United States Patent
Tamaki et al.

(10) Patent No.: US 9,350,482 B2
(45) Date of Patent: May 24, 2016

(54) WAVELENGTH AND BANDWIDTH ALLOCATION METHOD

(71) Applicant: NIPPON TELEGRAPH AND TELEPHONE CORPORATION, Tokyo (JP)

(72) Inventors: Shinya Tamaki, Yokosuka (JP); Hirotaka Nakamura, Yokosuka (JP); Shunji Kimura, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 42 days.

(21) Appl. No.: 14/366,774

(22) PCT Filed: Dec. 28, 2012

(86) PCT No.: PCT/JP2012/084106
§ 371 (c)(1),
(2) Date: Jun. 19, 2014

(87) PCT Pub. No.: WO2013/108577
PCT Pub. Date: Jul. 25, 2013

(65) Prior Publication Data
US 2014/0355992 A1    Dec. 4, 2014

(30) Foreign Application Priority Data

Jan. 17, 2012 (JP) ................................ 2012-007464

(51) Int. Cl.
*H04J 14/02* (2006.01)
*H04L 12/64* (2006.01)

(52) U.S. Cl.
CPC ........... *H04J 14/0227* (2013.01); *H04J 14/025* (2013.01); *H04J 14/0246* (2013.01);
(Continued)

(58) Field of Classification Search
None
See application file for complete search history.

(56) References Cited

U.S. PATENT DOCUMENTS

| 2003/0048805 A1 | 3/2003 | Yoshihara et al. |
| 2007/0071031 A1 | 3/2007 | Shin et al. |

(Continued)

FOREIGN PATENT DOCUMENTS

| EP | 1292054 A2 | 3/2003 |
| JP | 2003087281 | 3/2003 |

(Continued)

OTHER PUBLICATIONS

International Search Report dated Jan. 29, 2013 corresponding to PCT/JP2012/084106, 2 pp.
(Continued)

*Primary Examiner* — Darren E Wolf
(74) *Attorney, Agent, or Firm* — Ohlandt Greeley Ruggiero & Perle L.L.P.

(57) ABSTRACT

A wavelength and bandwidth allocation method which includes in order: a wavelength allocation step of allocating each wavelength of an uplink signal to each ONU so that the sum of target bandwidths each allocated as a target to each of the ONUs to which each wavelength of the uplink signal is allocated does not exceed a bandwidth allocated to each wavelength of the uplink signal; and a bandwidth allocation step of allocating a bandwidth to each of the ONUs based on any one of a plurality of requested bandwidths accepted from each of the ONUs in each wavelength of the uplink signal so that the bandwidth actually allocated to each of the ONUs converges to the target bandwidth allocated as a target to each of the ONUs.

17 Claims, 11 Drawing Sheets

(52) U.S. Cl.
CPC ......... *H04J14/0247* (2013.01); *H04J 14/0252* (2013.01); *H04J 14/0282* (2013.01); *H04L 12/6418* (2013.01)

(56) References Cited

U.S. PATENT DOCUMENTS

| | | |
|---|---|---|
| 2007/0274339 A1 | 11/2007 | Kim et al. |
| 2012/0301145 A1 | 11/2012 | Kozaki et al. |

FOREIGN PATENT DOCUMENTS

| | | |
|---|---|---|
| JP | 2011024133 | 2/2011 |
| WO | 2011005223 A1 | 1/2011 |
| WO | 2011092822 A1 | 8/2011 |

OTHER PUBLICATIONS

Dhaini, et al., "Dynamic Wavelength and Bandwidth Allocation in Hybrid TDM/WDM EPON Networks". Journal of Lightwave Technology, vol. 25, No. 1, Jan. 2007, 10 pp.
Nakamura, et al., "40Gbit/s lambda-tunable stacked-WDM/TDM-PON using dynamic wavelength and bandwidth allocation". Optical Society of America, 2011, 3 pp.
McGarry, et al., "WDM Ethernet Passive Optical Networks". IEEE Optical Communications, Feb. 2006, 8 pp.
International Preliminary Report on Patentability dated Jul. 31, 2014 corresponding to PCT/JP2012/084106, 2 pp.
Written Opinion of the International Searching Authority dated Jan. 29, 2013 corresponding to PCT/JP2012/084106, 6 pp.
Korean Office Action, with English translation, dated Sep. 3, 2015 from corresponding Korean Application No. 10-2014-7016601, 10 pages.

WAVELENGTH AND BANDWIDTH ALLOCATION METHOD

TECHNICAL FIELD

The present invention relates to a wavelength and bandwidth allocation method in PON (Passive Optical Network) in which wavelength multiplexing and time division multiplexing are combined.

BACKGROUND ART

Along with the recent rapid spread of internet, an access system is required to be increased in capacity, advanced, and economized, and meanwhile, PON has been investigated as a means for realizing that. The PON is an optical communication system in which one optical line terminal (OLT) and a portion of a transmission path are shared by users, using an optical multiplexer/demultiplexer using an optical passive element, to contribute to economization.

Currently, in Japan, an economic optical communication system, GE-PON (Gigabit Ethernet (registered trademark) Passive Optical Network) in which a circuit capacity of 1 Gbps is shared by up to 32 users with time division multiplexing (TDM) is mainly introduced, whereby an FTTH (Fiber To The Home) service is provided at a realistic price.

In order to respond to the needs of a larger capacity, 10G-EPON with a total bandwidth of 10 Gbps class has been investigated as a next-generation optical access system, and international standardization has been completed in 2009. This is an optical communication system in which an increase in capacity is realized by increasing the bit rate of a transceiver, while using a transmission path portion, such as an optical fiber, which is the same as that of the GE-PON.

In future, although it is considered that an ultra-high definition video service, an ubiquitous service, and so on are required to have a large capacity of more than 10 G class, when the bit rate of the transceiver is merely increased from 10 G class to 40/100 G class, there is a problem that the practical application is difficult due to an increase of cost required for system upgrade.

As means for solving the above problem, there has been reported a wavelength tunable WDM/TDM-PON in which wavelength tunability is added to a transceiver in an OLT so that the transceiver in an OLT can be increased in a stepwise manner, according to a bandwidth requirement, and time division multiplexing (TDM) and wavelength division multiplexing (WDM) are combined effectively (for example, see Non-Patent Document 1).

CITATION LIST

Non-Patent Literature

Non-Patent Literature 1: Hirotaka Nakamura, et al., "40G bit/s λ-tunable stacked-WDM/TDM-PON using dynamic wavelength and bandwidth allocation", OThT4. pdf, OSA/OFC/NFOEC2011.
Non-Patent Literature 2: Michael P. McGarry et al., "WDM Ethernet (registered trademark) Passive Optical Networks", IEEE Optical Communications, 518-525, February 2006.
Non-Patent Literature 3: Ahmad R. Dhaini et al., "Dynamic Wavelength and Bandwidth Allocation in Hybrid TDM/WDM EPON Networks", Journal of Lightwave Technology, Vol. 25, No. 1, 277-286, January, 2007.

Patent Literature

Patent Literature 1: Japanese Patent Laid-Open Publication No. 2003-87281

SUMMARY OF INVENTION

Technical Problem

When the WDM/TDM-PON is operated, in order to efficiently distribute a total bandwidth of a system to each ONU (Optical Network Unit), an algorithm that dynamically allocates wavelength and bandwidth is required, and as methods therefor, some methods have been already reported (Non-Patent Literatures 2 and 3). However, in those reported methods, since time slots of a variable length are spread in random order in a variable period, there is a problem that it is difficult to suppress a quality difference relating to delay between subscribers.

In order to solve the above problem, as in DBA (Dynamic Bandwidth Allocation) reported in Patent Literature 1, it is considered to be effective that two kinds of large and small requested bandwidths are accepted from each ONU, and in a fixed period, while a bandwidth equal to the small requested bandwidth is given to most ONUs, a bandwidth equal to the large requested bandwidth is given to only a small portion of ONUs (multiple request method DBA). This is because since it is guaranteed that a minimum of bandwidth is certainly given once in each fixed period, a waiting time delay from when a bandwidth is allocated to a certain ONU in a certain period till when a bandwidth is allocated to the ONU again in the next period is suppressed to less than the time of the fixed period.

The prior art dynamic bandwidth allocation method in a multiple request method is shown in FIGS. 1 and 2. The small requested bandwidth is a maximum frame amount that does not exceed a threshold value described in FIG. 1 and does not sever a frame halfway. The large requested bandwidth is a total frame amount accumulated in a buffer. In a first DBA period, the bandwidth equal to the small requested bandwidth is given to each of ONUs 1-1, 1-2, and 1-3, and the bandwidth equal to the large requested bandwidth is given to ONU 1-4. In a second DBA period, the bandwidth equal to the small requested bandwidth is given to each of the ONUs 1-1, 1-2, and 1-4, and the bandwidth equal to the large requested bandwidth is given to the ONU 1-3. In a third DBA period, the bandwidth equal to the small requested bandwidth is given to each of ONUs 1-1, 1-3, and 1-4, and the bandwidth equal to the large requested bandwidth is given to the ONU 1-2. In a fourth DBA period, the bandwidth equal to the small requested bandwidth is given to each of ONUs 1-2, 1-3, and 1-4, and the bandwidth equal to the large requested bandwidth is given to the ONU 1-1.

In a time change in the bandwidth to which the ONU 1-4 is given, in the first DBA period, a bandwidth B1 equal to the large requested bandwidth is given, in the second, third, and fourth DBA periods, bandwidths B2, B3, and B4 equal to the small requested bandwidth are given, and in the subsequent DBA periods, a processing similar to that in the first to fourth DBA periods is repeated. The time change in the bandwidth to which the ONUs 1-1, 1-2, and 1-3 are given is similar to the time change in the bandwidth to which the ONU 1-4 is given. According to this constitution, an accumulated average bandwidth which is an actually allocated bandwidth converges to a target bandwidth which is a bandwidth allocated as a target, after a plurality of DBA periods.

However, since the prior art dynamic bandwidth allocation method in a multiple request method is a bandwidth allocation algorithm of single wavelength time division multiplexing PON, an LC (Line Card) accommodating the ONU cannot be changed by dynamically changing a transmission wavelength of the ONU.

Thus, in order to solve the above problem, an object of the present invention is to provide a dynamic wavelength and bandwidth allocation method using a multiple request method, which, in WDM/TDM-PON, realizes dynamic wavelength and bandwidth allocation enabling effective allocation of a total bandwidth of a plurality of wavelengths to each ONU, while suppressing a quality difference relating to delay between ONUs.

Solution to Problem

Each wavelength of the uplink signal is allocated to each ONU so that the sum of target bandwidths each allocated as a target to each ONU to which each wavelength of an uplink signal is allocated does not exceed a bandwidth allocated to each wavelength of the uplink signal. The bandwidth is allocated to each ONU based on any one of a plurality of requested bandwidths accepted from each ONU in each wavelength of the uplink signal so that the bandwidth actually allocated to each ONU converges to the target bandwidth allocated as a target to each ONU.

Specifically, the present invention is a wavelength and bandwidth allocation method, which, in a passive optical communication network in which a plurality of ONUs are connected to one OLT, each of the ONUs transmits an uplink signal of any one of a plurality of previously provided wavelengths to the OLT, and the OLT receives the uplink signals of all the previously provided wavelengths from each of the ONUs, is carried out by the OLT, the method including in order:

a target bandwidth calculation step of calculating a target bandwidth allocated as a target to each of the ONUs based on a subscription service class to which each of the ONUs subscribes and history information of a requested bandwidth requested by each of the ONUs;

a wavelength allocation step of allocating each wavelength of the uplink signal to each of the ONUs so that the sum of target bandwidths each allocated as a target to each of the ONUs to which each wavelength of the uplink signal is allocated does not exceed a bandwidth allocated to each wavelength of the uplink signal; and a bandwidth allocation step of allocating a bandwidth to each of the ONUs based on any one of a plurality of requested bandwidths accepted from each of the ONUs in each wavelength of the uplink signal so that the bandwidth actually allocated to each of the ONUs converges to the target bandwidth allocated as a target to each of the ONUs.

The present invention is a wavelength and bandwidth allocation program, which, in a passive optical communication network in which a plurality of ONUs are connected to one OLT, each of the ONUs transmits an uplink signal of any one of a plurality of previously provided wavelengths to the OLT, and the OLT receives the uplink signals of all the previously provided wavelengths from each of the ONUs, causes the OLT to execute in order:

a target bandwidth calculation procedure for calculating a target bandwidth allocated as a target to each of the ONUs based on a subscription service class to which each of the ONUs subscribes and history information of a requested bandwidth requested by each of the ONUs;

a wavelength allocation procedure for allocating each wavelength of the uplink signal to each of the ONUs so that the sum of target bandwidths each allocated as a target to each of the ONUs to which each wavelength of the uplink signal is allocated does not exceed a bandwidth allocated to each wavelength of the uplink signal; and a bandwidth allocation procedure for allocating a bandwidth to each of the ONUs based on any one of a plurality of requested bandwidths accepted from each of the ONUs in each wavelength of the uplink signal so that the bandwidth actually allocated to each of the ONUs converges to the target bandwidth allocated as a target to each of the ONUs.

The present invention is a storage medium recording a wavelength and bandwidth allocation program, which, in a passive optical communication network in which a plurality of ONUs are connected to one OLT, each of the ONUs transmits an uplink signal of any one of a plurality of previously provided wavelengths to the OLT, and the OLT receives the uplink signals of all the previously provided wavelengths from each of the ONUs, causes the OLT to execute in order:

a target bandwidth calculation procedure for calculating a target bandwidth allocated as a target to each of the ONUs based on a subscription service class to which each of the ONUs subscribes and history information of a requested bandwidth requested by each of the ONUs;

a wavelength allocation procedure for allocating each wavelength of the uplink signal to each of the ONUs so that the sum of target bandwidths each allocated as a target to each of the ONUs to which each wavelength of the uplink signal is allocated does not exceed a bandwidth allocated to each wavelength of the uplink signal; and a bandwidth allocation procedure for allocating a bandwidth to each of the ONUs based on any one of a plurality of requested bandwidths accepted from each of the ONUs in each wavelength of the uplink signal so that the bandwidth actually allocated to each of the ONUs converges to the target bandwidth allocated as a target to each of the ONUs.

According to the above constitution, the present invention can provide a dynamic wavelength and bandwidth allocation method using a multiple request method, which, in WDM/TDM-PON, realizes dynamic wavelength and bandwidth allocation enabling effective allocation of a total bandwidth of a plurality of wavelengths to each ONU, while suppressing a quality difference relating to delay between ONUs.

In the wavelength and bandwidth allocation method according to the present invention, in the wavelength allocation step, each wavelength of the uplink signal is allocated to each of the ONUs so that the sum of the target bandwidths each allocated as a target to each of the ONUs to which each wavelength of the uplink signal is allocated is substantially equal among each wavelength of the uplink signal.

According to the above constitution, a use efficiency of each wavelength of the uplink signal can be made substantially equal.

In the wavelength and bandwidth allocation method according to the present invention, in the wavelength allocation step, a subtraction bandwidth obtained by subtracting a target bandwidth allocated as a target from an actually allocated bandwidth is calculated, and the wavelength of the uplink signal to be allocated is replaced with respect to the ONU with the smallest subtraction bandwidth and the ONU with the largest subtraction bandwidth.

According to the above constitution, the quality difference relating to delay between ONUs can be easily suppressed.

In the wavelength and bandwidth allocation method according to the present invention, in the wavelength allocation step, a subtraction bandwidth obtained by subtracting a target bandwidth allocated as a target from an actually allocated bandwidth is calculated, and the wavelength of the uplink signal to be allocated to the ONU with the smallest subtraction bandwidth is changed to the wavelength of the uplink signal allocated to the ONU with the largest subtraction bandwidth.

According to the above constitution, the quality difference relating to delay between ONUs can be easily suppressed.

In the wavelength and bandwidth allocation method according to the present invention, in the wavelength allocation step, each wavelength of the uplink signal is allocated to each of the ONUs so that the sum of the target bandwidths each allocated as a target to each of the ONUs to which each wavelength of the uplink signal is allocated does not exceed the bandwidth to be allocated to each wavelength of the uplink signal, regardless of a subtraction bandwidth obtained by subtracting a target bandwidth allocated as a target from an actually allocated bandwidth.

According to the above constitution, the quality difference relating to delay between ONUs can be reliably suppressed.

In the wavelength and bandwidth allocation method according to the present invention, the target bandwidth calculation step and the wavelength allocation step are performed for each of a plurality of times of bandwidth allocation periods, and the bandwidth allocation step is performed for each bandwidth allocation period.

According to the above constitution, dynamic wavelength allocation can be performed for each of a plurality of times of bandwidth allocation periods.

In the wavelength and bandwidth allocation method according to the present invention, the target bandwidth calculation step, the wavelength allocation step, and the bandwidth allocation step are performed for each bandwidth allocation period.

According to the above constitution, the dynamic wavelength allocation can be performed for each bandwidth allocation period.

Effect of the Invention

The present invention can provide a dynamic wavelength and bandwidth allocation method using a multiple request method, which, in WDM/TDM-PON, realizes dynamic wavelength and bandwidth allocation enabling effective allocation of a total bandwidth of a plurality of wavelengths to each ONU, while suppressing a quality difference relating to delay between ONUs.

DESCRIPTION OF EMBODIMENTS

Figure 1:
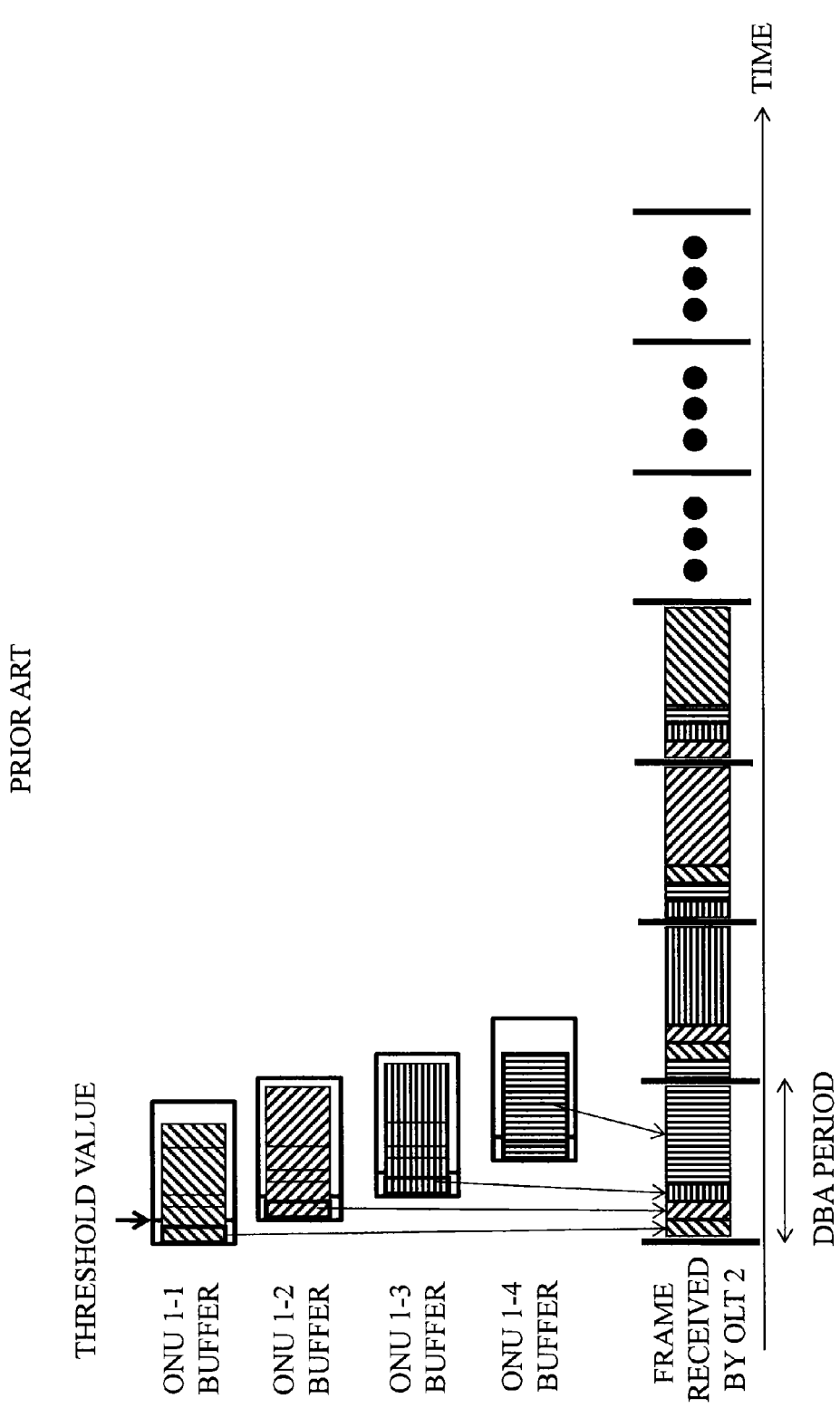
FIG. 1 is a view showing the prior art dynamic bandwidth allocation method in a multiple request method.
Figure 2:
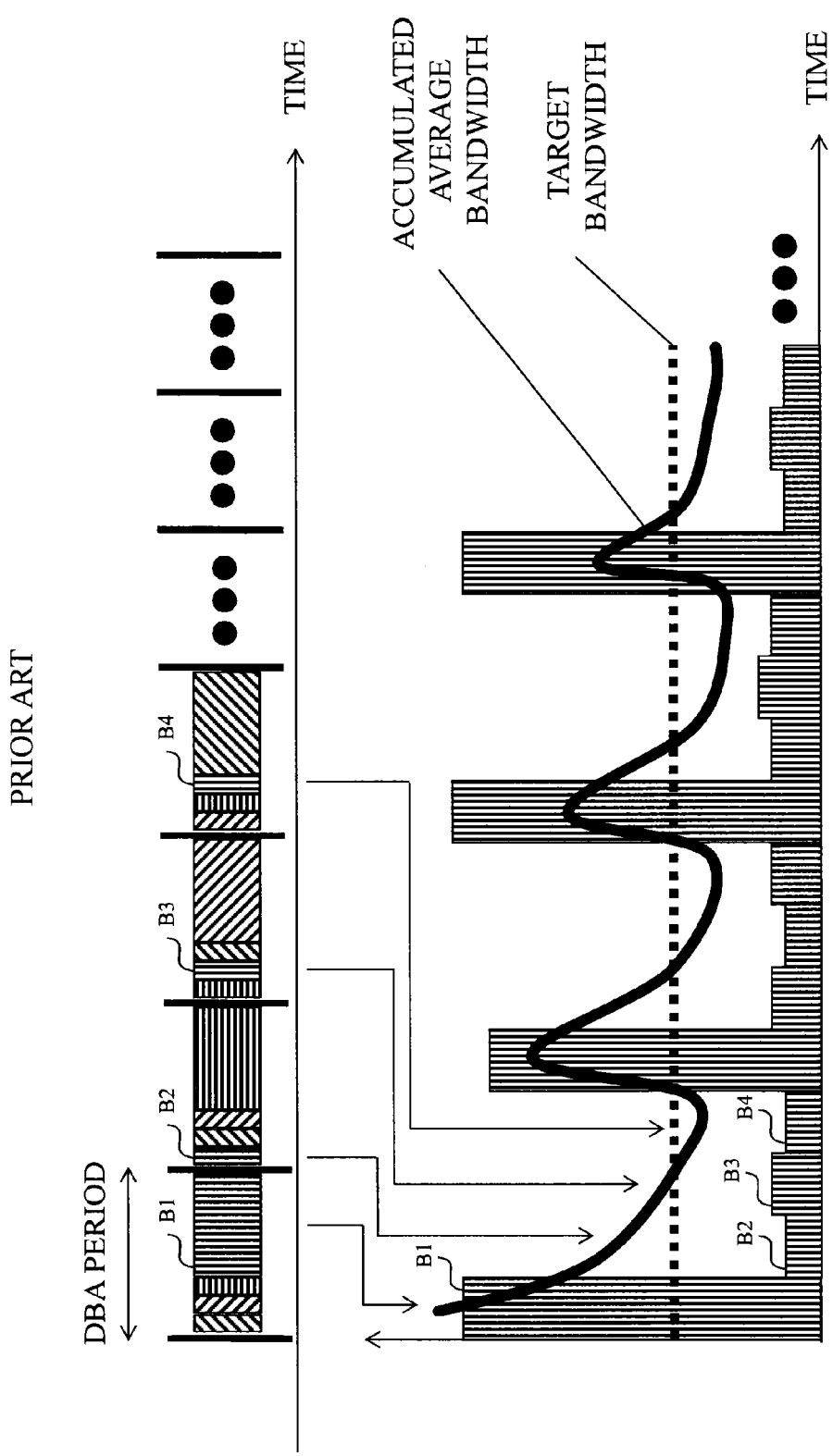
FIG. 2 is a view showing the prior art dynamic bandwidth allocation method in the multiple request method.

Embodiments of the present invention will be described with reference to the accompanying drawings. The embodiments to be described below are examples of the present invention, and the invention is not limited to the following embodiments. Components denoted by the same reference numerals in the present specification and the drawings mutually denote the same components.

(Summary of Optical Communication System)

Figure 3:
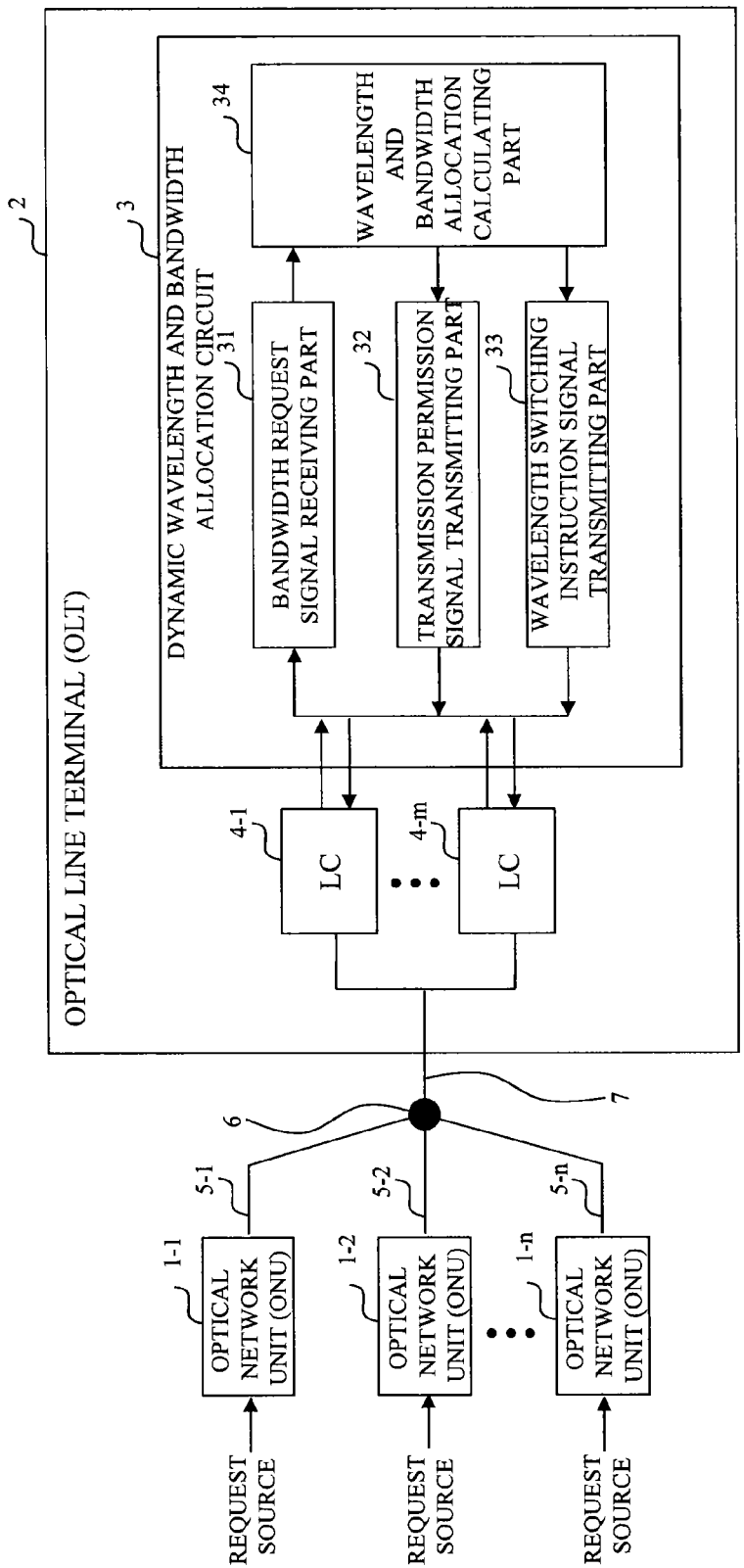
FIG. 3 is a view showing a configuration of an optical communication system of the present invention.

A configuration of an optical communication system of the present invention is shown in FIG. 3. The optical communication system is constituted of ONUs 1-1, 1-2, . . . , and 1-$n$, an OLT 2, transmission paths 5-1, 5-2, . . . , and 5-$n$, a splitter 6, and a transmission path 7. The ONUs 1-1, 1-2, . . . , and 1-$n$ are connected respectively to the transmission paths 5-1, 5-2, . . . , and 5-$n$. The OLT 2 is connected to the transmission path 7 and shared among the ONUs 1-1, 1-2, . . . , and 1-$n$. The splitter 6 is connected to the transmission paths 5-1, 5-2, . . . , 5-$n$, and 7 and shared among the ONUs 1-1, 1-2, . . . , and 1-$n$.

The OLT 2 is constituted of a dynamic wavelength and bandwidth allocation circuit 3 and LCs 4-1, . . . , and 4-$m$. The dynamic wavelength and bandwidth allocation circuit 3 is constituted of a bandwidth request signal receiving part 31, a transmission permission signal transmitting part 32, a wavelength switching instruction signal transmitting part 33, and a wavelength and bandwidth allocation calculating part 34. The LCs 4-1, . . . , and 4-$m$ transmit and receive signals of wavelengths $\lambda_1, \ldots$, and $\lambda_m$. The bandwidth request signal receiving part 31 accepts a plurality of requested bandwidths from each of the ONUs 1. The transmission permission signal transmitting part 32 transmits a transmission permission signal to each of the ONUs 1 based on an allocation bandwidth calculated by the wavelength and bandwidth allocation calculating part 34. The wavelength switching instruction signal transmitting part 33 transmits a wavelength switching instruction signal to each of the ONUs 1 based on an allocation wavelength calculated by the wavelength and bandwidth allocation calculating part 34.

The wavelength and bandwidth allocation calculating part 34 calculates a target bandwidth to be allocated as a target to each of the ONUs 1 based on a subscription service class to which each of the ONUs 1 subscribes and history information of the requested bandwidth requested by each of the ONUs 1. Then, the wavelength and bandwidth allocation calculating part 34 allocates each wavelength of an uplink signal to each of the ONUs 1 so that the sum of target bandwidths each allocated as a target to each of the ONUs 1 to which each wavelength of the uplink signal is allocated does not exceed the bandwidth to be allocated to each wavelength of the uplink signal. Further, the wavelength and bandwidth allocation calculating part 34 allocates the bandwidth to each of the ONUs 1 based on any one of a plurality of requested bandwidths accepted from each of the ONUs 1 in each wavelength of the uplink signal so that the bandwidth actually allocated to each of the ONUs 1 converges to the target bandwidth allocated as a target to each of the ONUs 1.

Figure 4:
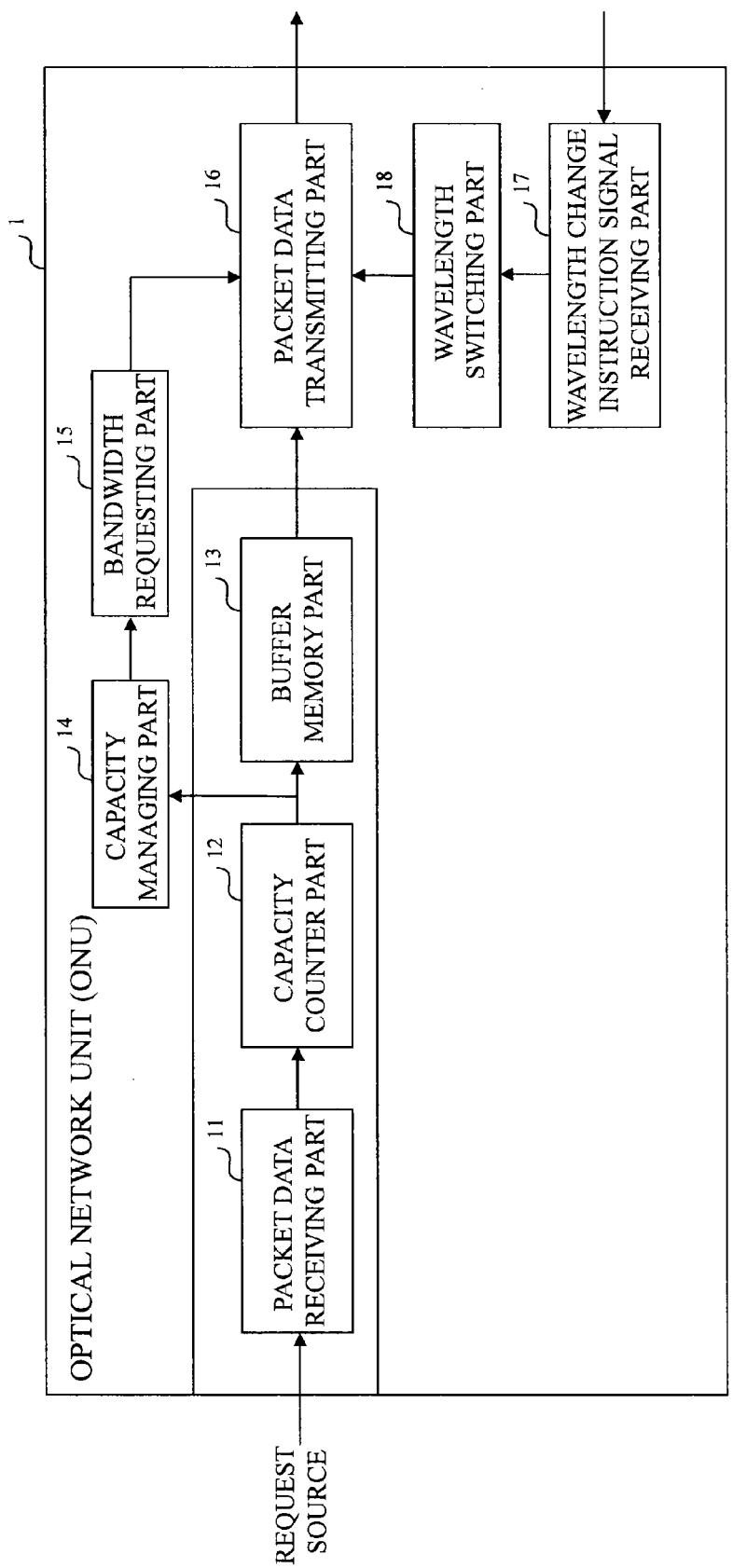
FIG. 4 is a view showing a configuration of an ONU of the present invention.

FIG. 4 shows a configuration of the ONU of the present invention. The ONU 1 is constituted of a packet data receiving part 11, a capacity counter part 12, a buffer memory part 13, a capacity managing part 14, a bandwidth requesting part 15, a packet data transmitting part 16, a wavelength change instruction signal receiving part 17, and a wavelength switching part 18.

The packet data receiving part 11 receives uplink packet data from a request source. The capacity counter part 12 counts the capacity of the uplink packet data. The buffer memory part 13 temporarily stores the uplink packet data. The capacity managing part 14 manages the capacity of the uplink packet data in packet units. The bandwidth requesting part 15 calculates a small requested bandwidth as a maximum frame amount that does not exceed a threshold value and does not sever a frame halfway, calculates a large requested bandwidth which is a total frame amount accumulated in the buffer memory part 13, and requests the small requested bandwidth and the large requested bandwidth. The packet data transmitting part 16 transmits the uplink packet data to the OLT 2 and transmits the small requested bandwidth and the large requested bandwidth to the OLT 2. The wavelength change instruction signal receiving part 17 receives a wavelength change instruction signal from the OLT 2. The wavelength switching part 18 switches a transmission wavelength of the packet data transmitting part 16 based on the wavelength change instruction signal.

Hereinafter, there will be described a summary of a procedure in which the wavelength and bandwidth allocation calculating part 34 calculates the target bandwidth to be allocated as a target to each of the ONUs 1 based on the subscription service class to which each of the ONUs 1 subscribes and the history information of the requested bandwidth requested by each of the ONUs 1.

The wavelength and bandwidth allocation calculating part 34 determines a plurality of wavelengths of the uplink signal from each of the ONUs 1 to the OLT 2 to guarantee a guaranteed bandwidth corresponding to the subscription service class of each of the ONUs 1. Then, the wavelength and bandwidth allocation calculating part 34 distributes, as reference bandwidths, all the bandwidths of the determined wavelengths to the ONUs 1 according to the subscription service class of each of the ONUs 1 and makes the reference bandwidths of the ONUs 1 whose the subscription service classes are the same to be the same.

The wavelength and bandwidth allocation calculating part 34 calculates a difference between the requested bandwidth in the history information and the reference bandwidth of each of the ONUs 1 and, further calculates a surplus bandwidth of each of the ONUs 1 in which the reference bandwidth is more surplus than the requested bandwidth in the history information and an excess bandwidth of each of the ONUs 1 in which the requested bandwidth in the history information is more excess than the reference bandwidth. Then, the wavelength and bandwidth allocation calculating part 34 distributes the surplus bandwidth of each of the ONUs 1 in which the reference bandwidth is more surplus than the requested bandwidth in the history information to each of the ONUs 1 in which the requested bandwidth in the history information is more excess than the reference bandwidth. The bandwidth thus calculated is the target bandwidth to be allocated as a target to each of the ONUs 1.

Hereinafter, there will be described a procedure in which the wavelength and bandwidth allocation calculating part 34 allocates each wavelength of the uplink signal to each of the ONUs 1 so that the sum of the target bandwidths each allocated as a target to each of the ONUs 1 to which each wavelength of the uplink signal is allocated does not exceed the bandwidth to be allocated to each wavelength of the uplink signal.

Figure 5:
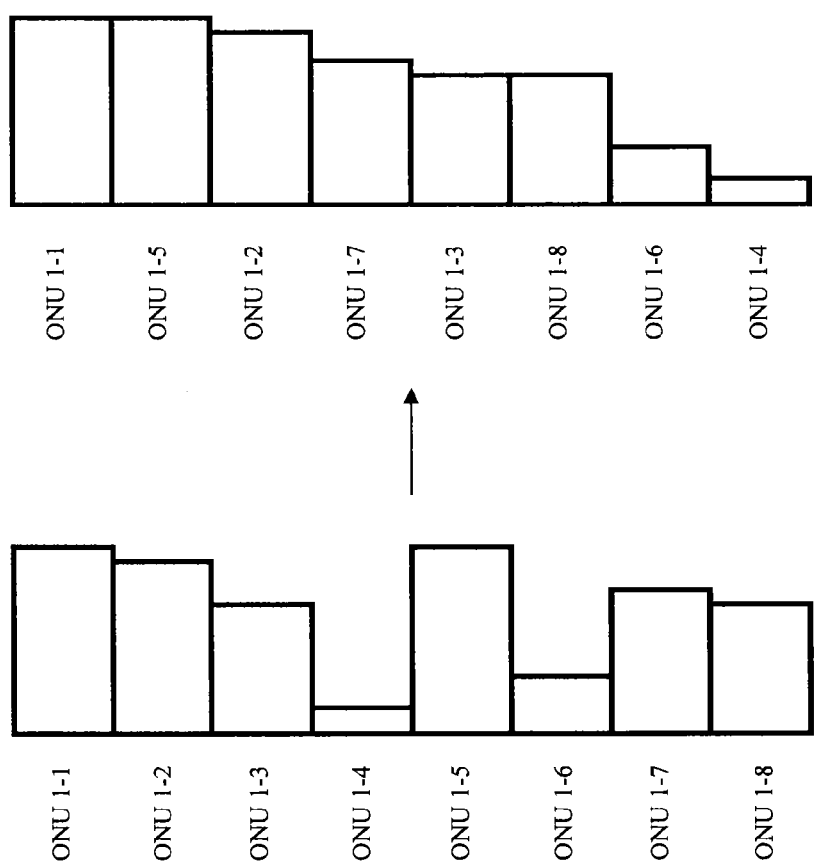
FIG. 5 is a view showing a dynamic wavelength allocation method of the present invention.
Figure 6:
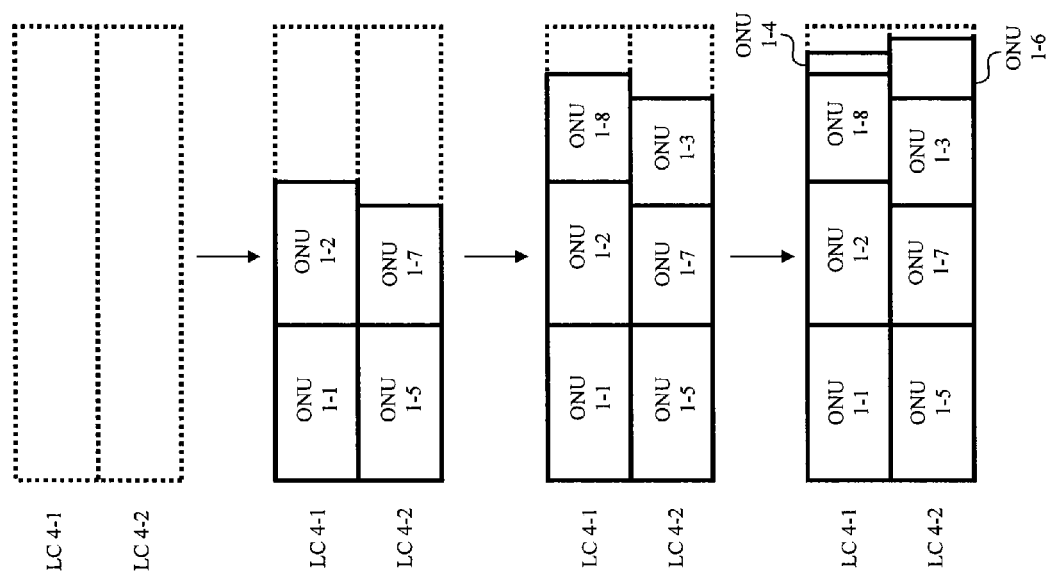
FIG. 6 is a view showing the dynamic wavelength allocation method of the present invention.

FIGS. 5 and 6 show a dynamic wavelength allocation method of the present invention. The wavelength and bandwidth allocation calculating part 34 enumerates the target bandwidths of the ONUs 1 in numerical order, as shown on the left side of FIG. 5. The wavelength and bandwidth allocation calculating part 34 arranges the target bandwidths of the ONUs 1 in descending order, as shown on the right side of FIG. 5. The LCs 4-1 and 4-2 are used as shown at a first stage from the top of FIG. 6.

As shown at a second stage from the top of FIG. 6, the wavelength and bandwidth allocation calculating part 34 allocates the LC 4-1 to the ONU 1-1, allocates the LC 4-2 to the ONU 1-5, allocates the LC 4-1 to the ONU 1-2, and allocates the LC 4-2 to the ONU 1-7. As shown at a third stage from the top of FIG. 6, the wavelength and bandwidth allocation calculating part 34 allocates the LC 4-2 to the ONU 1-3 and allocates the LC 4-1 to the ONU 1-8. As shown at a fourth stage from the top of FIG. 6, the wavelength and bandwidth allocation calculating part 34 allocates the LC 4-2 to the ONU 1-6 and allocates the LC 4-1 to the ONU 1-4.

Namely, the wavelength and bandwidth allocation calculating part 34 allocates each wavelength of the uplink signal to each of the ONUs 1 so that the sum of the target bandwidths each allocated as a target to each of the ONUs 1 to which each wavelength of the uplink signal is allocated is substantially equal among each wavelength of the uplink signal. Then, the wavelength and bandwidth allocation calculating part 34 accommodates each of the ONUs 1 in the LC 4 with the largest vacancy and the youngest number in the order of larger target bandwidth of the ONU 1. However, in the wavelength and bandwidth allocation calculating part 34, as long as the sum of the target bandwidths each allocated as a target to each of the ONUs 1 to which each wavelength of the uplink signal is allocated is substantially equal among each wavelength of the uplink signal, a random accommodation method and other regular accommodation methods may be adopted.

Embodiment 1

Figure 7:
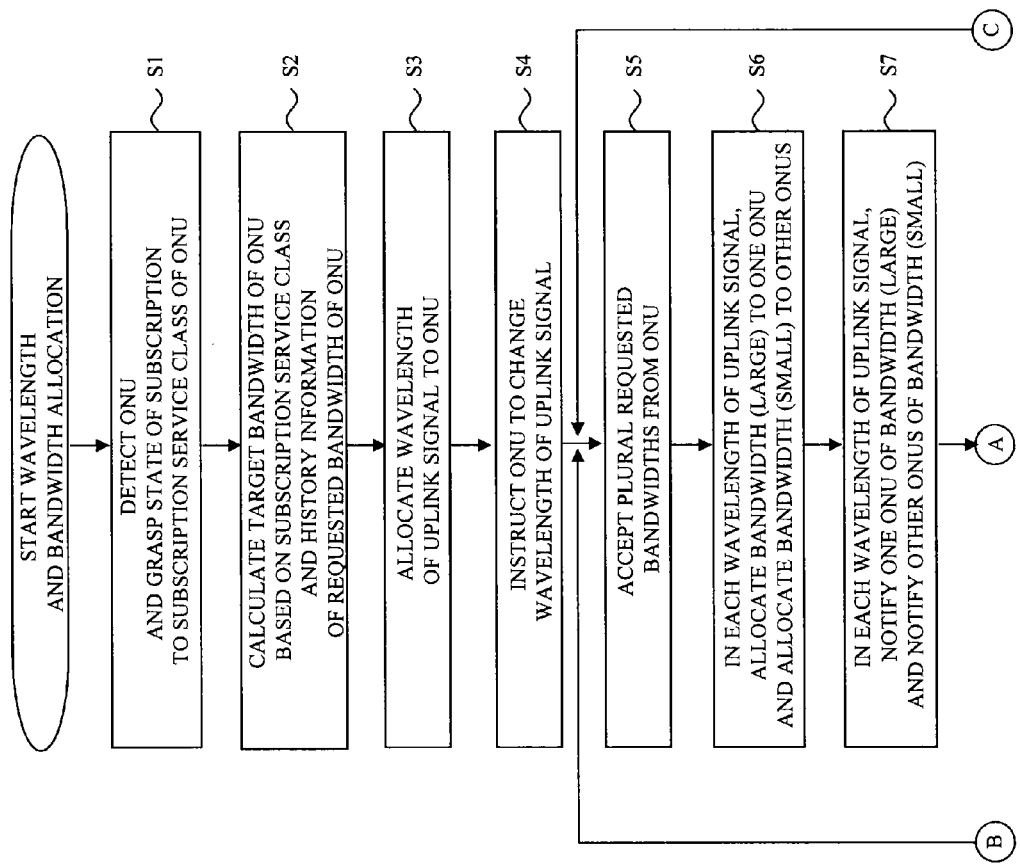
FIG. 7 is a flow chart showing a wavelength and bandwidth allocation method of an embodiment 1.
Figure 8:
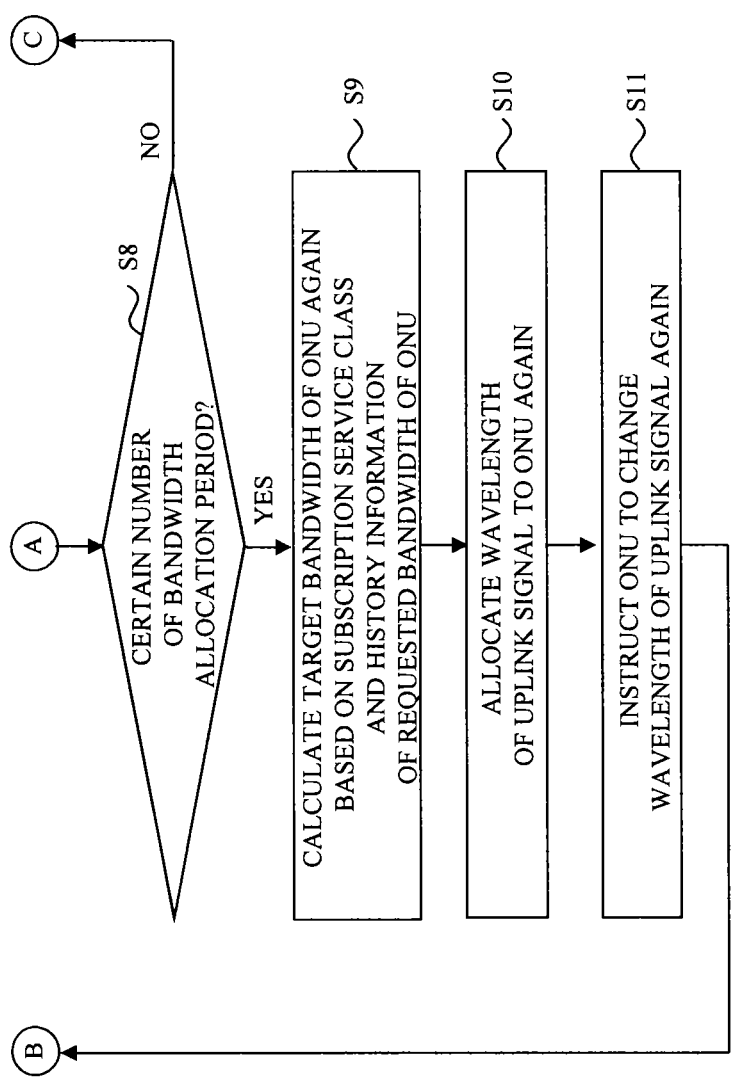
FIG. 8 is a flow chart showing the wavelength and bandwidth allocation method of the embodiment 1.
Figure 9:
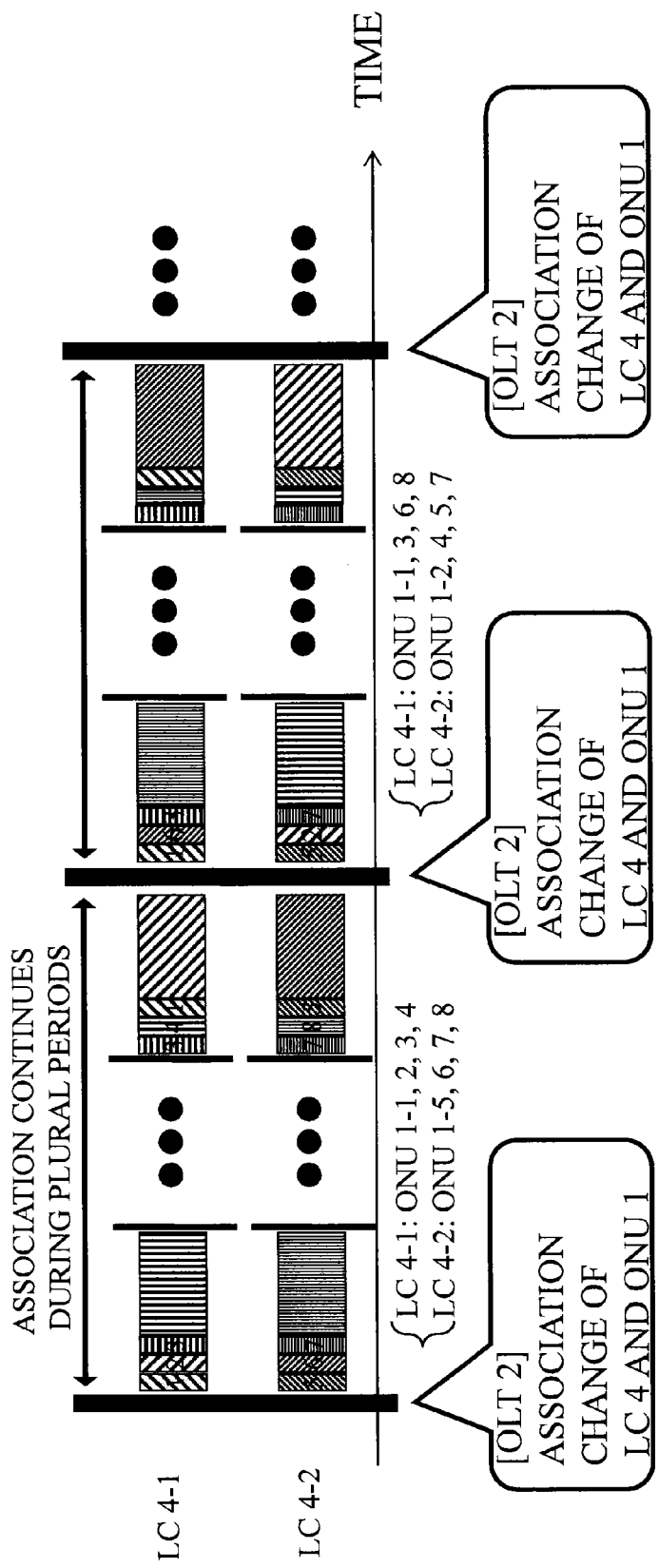
FIG. 9 is a view showing the wavelength and bandwidth allocation method of the embodiment 1.

In an embodiment 1, the calculation of the target bandwidth and the allocation of the wavelength are performed for each of a plurality of times of bandwidth allocation periods, and the allocation of the bandwidth is performed for each bandwidth allocation period. FIGS. 7 and 8 show flow charts of a wavelength and bandwidth allocation method of the embodiment 1. FIG. 9 shows the wavelength and bandwidth allocation method of the embodiment 1.

The wavelength and bandwidth allocation calculating part 34 detects each of the ONUs 1 and grasps a state of subscription to the subscription service class of each of the ONUs 1 (step S1). The wavelength and bandwidth allocation calculating part 34 calculates the target bandwidth of each of the ONUs 1 based on the subscription service class and the history information of the requested bandwidth of each of the ONUs 1 (step S2). The wavelength and bandwidth allocation calculating part 34 allocates the wavelength of the uplink signal to each of the ONUs 1 (step S3). The wavelength switching instruction signal transmitting part 33 instructs each of the ONUs 1 to change the wavelength of the uplink signal (step S4).

The bandwidth request signal receiving part 31 accepts a plurality of the requested bandwidths from each of the ONUs 1 (step S5). The wavelength and bandwidth allocation calculating part 34 allocates the bandwidth equal to the large requested bandwidth to one ONU 1 and allocates the bandwidths equal to the small requested bandwidths to the other ONUs 1 in each wavelength of the uplink signal (step S6). The transmission permission signal transmitting part 32 notifies one ONU 1 of the bandwidth equal to the large requested bandwidth and notifies the other ONUs 1 of the bandwidth equal to the small requested bandwidth in each wavelength of the uplink signal (step S7). Namely, a dynamic bandwidth allocation method in a multiple request method is performed in each of the LCs 4-1 and 4-2.

When steps S5 to S7 are not repeated by a certain number of the bandwidth allocation periods (NO in step S8), steps S5 to S7 are repeated. The case where steps S5 to S7 are repeated by a certain number of the bandwidth allocation periods will be described (YES in step S8). The wavelength and bandwidth allocation calculating part 34 calculates the target bandwidth of each of the ONUs 1 again based on the subscription service class and the history information of the requested bandwidth of each of the ONUs 1 (step S9). The wavelength and bandwidth allocation calculating part 34 allocates the wavelength of the uplink signal to each of the ONUs 1 again (step S10). The wavelength switching instruction signal transmitting part 33 instructs each of the ONUs 1 to change the wavelength of the uplink signal again (step S11). Then, steps S5 to S7 are repeated.

Here, in step S10, a subtraction bandwidth obtained by subtracting the target bandwidth allocated as a target from an actually allocated accumulation bandwidth is calculated, and the wavelength of the uplink signal to be allocated may be replaced with respect to the ONU 1 with the smallest subtraction bandwidth (that is, the most disadvantageous ONU 1) and the ONU 1 with the largest subtraction bandwidth (that is, the most advantageous ONU 1). According to this constitution, a quality difference relating to delay between the ONUs 1 can be easily suppressed.

In step S10, the subtraction bandwidth obtained by subtracting the target bandwidth allocated as a target from an actually allocated accumulation bandwidth is calculated, and the wavelength of the uplink signal to be allocated to the ONU 1 with the smallest subtraction bandwidth (that is, the most disadvantageous ONU 1) may be changed to the wavelength of the uplink signal allocated to the ONU 1 with the largest subtraction bandwidth (that is, the most advantageous ONU 1). According to this constitution, the quality difference relating to delay between the ONUs 1 can be easily suppressed.

Further, in step S10, each wavelength of the uplink signal may be allocated to each of the ONUs 1 so that the sum of the target bandwidths each allocated as a target to each of the ONUs 1 to which each wavelength of the uplink signal is allocated does not exceed the bandwidth to be allocated to each wavelength of the uplink signal, regardless of the subtraction bandwidth obtained by subtracting the target bandwidth allocated as a target from the actually allocated accumulation bandwidth. According to this constitution, the quality difference relating to delay between the ONUs 1 can be reliably suppressed.

In FIG. 9, in a first association change of the LC 4 and the ONU 1, the ONUs 1-1, 1-2, 1-3, and 1-4 are accommodated in the LC 4-1, and the ONUs 1-5, 1-6, 1-7, and 1-8 are accommodated in the LC 4-2. In a second association change of the LC 4 and the ONU 1, the ONUs 1-1, 1-3, 1-6, and 1-8 are accommodated in the LC 4-1, and the ONUs 1-2, 1-4, 1-5, and 1-7 are accommodated in the LC 4-2. In the association change of the LC 4 and the ONU 1, a plurality of the ONUs 1 may be thus moved from the LCs 4-1 and 4-2.

Embodiment 2

Figure 10:
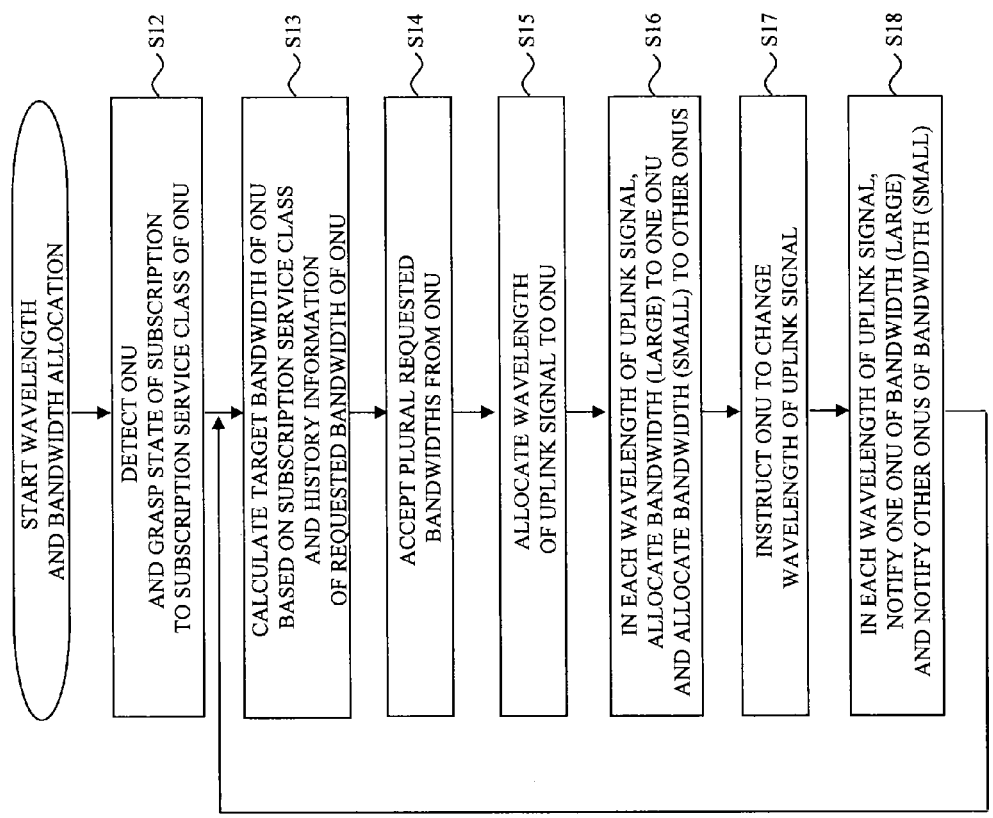
FIG. 10 is a flow chart showing a wavelength and bandwidth allocation method of an embodiment 2.
Figure 11:
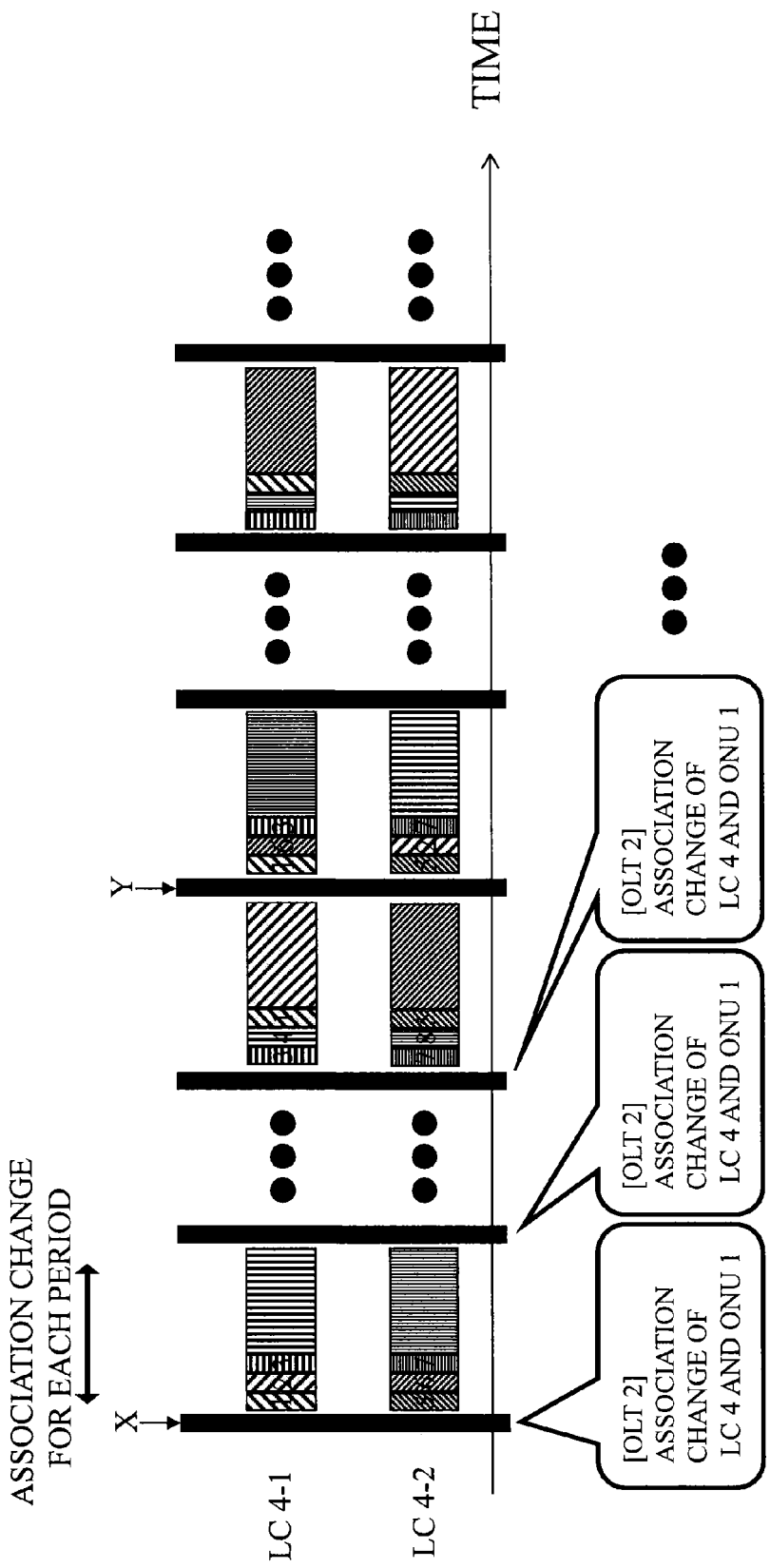
FIG. 11 is a view showing the wavelength and bandwidth allocation method of the embodiment 2.

In an embodiment 2, the calculation of the target bandwidth, the allocation of the wavelength, and the allocation of the bandwidth are performed for each bandwidth allocation period. FIG. 10 shows a flow chart of a wavelength and bandwidth allocation method of the embodiment 2. FIG. 11 shows the wavelength and bandwidth allocation method of the embodiment 2.

The wavelength and bandwidth allocation calculating part 34 detects each of the ONUs 1 and grasps the state of subscription to the subscription service class of each of the ONUs 1 (step S12). The wavelength and bandwidth allocation calculating part 34 calculates the target bandwidth of each of the ONUs 1 based on the subscription service class and the history information of the requested bandwidth of each of the ONUs 1 (step S13).

The bandwidth request signal receiving part 31 accepts a plurality of the requested bandwidths from each of the ONUs 1 (step S14). The wavelength and bandwidth allocation calculating part 34 allocates the wavelength of the uplink signal to each of the ONUs 1 (step S15). The wavelength and bandwidth allocation calculating part 34 allocates the bandwidth equal to the large requested bandwidth to one ONU 1 and allocates the bandwidths equal to the small requested bandwidths to the other ONUs 1 in each wavelength of the uplink signal (step S16). The wavelength switching instruction signal transmitting part 33 instructs each of the ONUs 1 to change the wavelength of the uplink signal (step S17). The transmission permission signal transmitting part 32 notifies one ONU 1 of the bandwidth equal to the large requested bandwidth and notifies the other ONUs 1 of the bandwidth equal to the small requested bandwidth in each wavelength of the uplink signal (step S18). Namely, a dynamic bandwidth allocation method in a multiple request method is performed in each of the LCs 4-1 and 4-2.

The wavelength and bandwidth allocation calculating part 34 calculates the target bandwidth of each of the ONUs 1 again based on the subscription service class and the history information of the requested bandwidth of each of the ONUs 1 (step S13). The wavelength and bandwidth allocation calculating part 34 allocates the wavelength of the uplink signal to each of the ONUs 1 again (step S15). The wavelength switching instruction signal transmitting part 33 instructs each of the ONUs 1 to change the wavelength of the uplink signal again (step S17). Steps S13 to S18 are thus repeated.

Here, in the second and subsequent step S15, the subtraction bandwidth obtained by subtracting the target bandwidth allocated as a target from an actually allocated accumulation bandwidth is calculated, and the wavelength of the uplink signal to be allocated may be replaced with respect to the ONU 1 with the smallest subtraction bandwidth (that is, the most disadvantageous ONU 1) and the ONU 1 with the largest subtraction bandwidth (that is, the most advantageous ONU 1). According to this constitution, the quality difference relating to delay between the ONUs 1 can be easily suppressed.

In the second and subsequent step S15, the subtraction bandwidth obtained by subtracting the target bandwidth allocated as a target from an actually allocated accumulation bandwidth is calculated, and the wavelength of the uplink signal to be allocated to the ONU 1 with the smallest subtraction bandwidth (that is, the most disadvantageous ONU 1) may be changed to the wavelength of the uplink signal allocated to the ONU 1 with the largest subtraction bandwidth (that is, the most advantageous ONU 1). According to this constitution, the quality difference relating to delay between the ONUs 1 can be easily suppressed.

Further, in the second and subsequent step S15, regardless of the subtraction bandwidth obtained by subtracting the target bandwidth allocated as a target from the actually allocated accumulation bandwidth, each wavelength of the uplink signal may be allocated to each of the ONUs 1 so that the sum of the target bandwidths each allocated as a target to each of the ONUs 1 to which each wavelength of the uplink signal is allocated does not exceed the bandwidth to be allocated to each wavelength of the uplink signal. According to this constitution, the quality difference relating to delay between the ONUs 1 can be reliably suppressed.

In FIG. 11, in the association change of the LC 4 and the ONU 1 shown by X, the ONUs 1-1, 1-2, 1-3, and 1-4 are accommodated in the LC 4-1, and the ONUs 1-5, 1-6, 1-7, and 1-8 are accommodated in the LC 4-2. In the association change of the LC 4 and the ONU 1 shown by Y, the ONUs 1-1, 1-3, 1-6, and 1-8 are accommodated in the LC 4-1, and the ONUs 1-2, 1-4, 1-5, and 1-7 are accommodated in the LC 4-2. In the association change of the LC 4 and the ONU 1, a plurality of the ONUs 1 may be thus moved from the LCs 4-1 and 4-2.

(Wavelength and Bandwidth Allocation Program and Recording Medium Recording this Program)

In the embodiments 1 and 2, the function of the dynamic wavelength and bandwidth allocation circuit 3 (particularly, the wavelength and bandwidth allocation calculating part 34) of the OLT 2 and the function of the bandwidth requesting part 15 of the ONU 1 are realized by executing a program stored in a storage part (not shown). The storage part is constituted of a nonvolatile memory such as a hard disk device, a magnetooptical disk device, and a flash memory, a volatile memory such as a RAM (Random Access Memory), or combination thereof. The storage part includes one holding a program for a certain period of time, like a server at the time when the program is transmitted through a network such as internet or a communication line such as a telephone line and a volatile memory (RAM) in a computer system as a client.

The above program may be transmitted to another computer system from a computer system storing this program in a storage device or the like through a transmission medium or a transmission wave in the transmission medium. The "transmission medium" used for transmitting the program is a medium having a function of transmitting information, like a network such as internet and a communication line such as a telephone line. The program may be used for realizing the above processing partially. Further, the program may be one which can realize the above processing in combination with a program already recorded in the dynamic wavelength and bandwidth allocation circuit 3 (particularly, the wavelength and bandwidth allocation calculating part 34) of the OLT 2 and the bandwidth requesting part 15 of the ONU 1 and namely may be a difference file (difference program).

INDUSTRIAL APPLICABILITY

In the wavelength and bandwidth allocation method, the wavelength and bandwidth allocation program, and a recording medium storing the wavelength and bandwidth allocation program according to the present invention, the invention can provide a dynamic wavelength and bandwidth allocation method using a multiple request method which, in WDM/TDM-PON, realizes dynamic wavelength and bandwidth allocation enabling effective allocation of a total bandwidth of a plurality of wavelengths to each ONU, while suppressing a quality difference relating to delay between ONUs.

REFERENCE SIGNS LIST

1 ONU
2 OLT
3 Dynamic wavelength and bandwidth allocation circuit
4 LC
5 Transmission path
6 Splitter
7 Transmission path
11 Packet data receiving part
12 Capacity counter part
13 Buffer memory part
14 Capacity managing part
15 Bandwidth requesting part
16 Packet data transmitting part
17 Wavelength change instruction signal receiving part
18 Wavelength switching part
31 Bandwidth request signal receiving part
32 Transmission permission signal transmitting part
33 Wavelength switching instruction signal transmitting part
34 Wavelength and bandwidth allocation calculating part

What is claimed is:

1. A wavelength and bandwidth allocation method, which is carried out by one optical line terminal (OLT) in a passive optical communication network in which a plurality of optical network units (ONUs) are connected to the OLT, each of the ONUs transmits an uplink signal of any one of a plurality of previously provided wavelengths to the OLT, and the OLT receives the uplink signals of all the previously provided wavelengths from each of the ONUs, the method comprising:
    a target bandwidth calculation step of distributing all bandwidths of the previously provided wavelengths to each of the ONUs as a reference bandwidth based on a subscription service class to which each of the ONUs subscribes, and calculating a target bandwidth for each of the ONUs based on the reference bandwidth distributed to each of the ONUs;
    a wavelength allocation step of allocating each of the wavelengths of the uplink signal to each of the ONUs so that a bandwidth allocated to each of the wavelengths of the uplink signal is larger than or equal to a sum of the target bandwidths for each of the ONUs to which each of the wavelengths of the uplink signal is allocated; and
    a bandwidth allocation step of, in each of the wavelengths of the uplink signal, allocating an actual bandwidth to each of the ONUs based on any one of a plurality of requested bandwidths accepted from each of the ONUs so that the actual bandwidth for each of the ONUs converges to the target bandwidth for each of the ONUs.

2. The wavelength and bandwidth allocation method according to claim 1, wherein in the wavelength allocation step, each of the wavelengths of the uplink signal is allocated to each of the ONUs so that the sum of the target bandwidths for each of the ONUs to which each of the wavelengths of the uplink signal is allocated is substantially equal among each of the wavelengths of the uplink signal.

3. The wavelength and bandwidth allocation method according to claim 2,
    wherein the wavelength allocation step is a first wavelength allocation step, and
    wherein the method further comprises a further wavelength allocation step that includes:
        calculating a subtraction bandwidth obtained by subtracting the target bandwidth from the actual bandwidth; and
        exchanging, between the ONU with the smallest subtraction bandwidth and the ONU with the largest subtraction bandwidth, the wavelengths of the uplink signal allocated in the first wavelength allocation step.

4. The wavelength and bandwidth allocation method according to claim 2,
wherein the wavelength allocation step is a first wavelength allocation step, and
wherein the method further comprises a further wavelength allocation step that includes:
calculating a subtraction bandwidth obtained by subtracting the target bandwidth from the actual bandwidth; and
changing (a) one of the wavelengths of the uplink signal allocated in the first wavelength allocation step to the ONU with the smallest subtraction bandwidth to (b) other of the wavelengths of the uplink signal allocated in the first wavelength allocation step to the ONU with the largest subtraction bandwidth.

5. The wavelength and bandwidth allocation method according to claim 2,
wherein the wavelength allocation step is a first wavelength allocation step, and
wherein the method further comprises a further wavelength allocation step that includes allocating each of the wavelengths of the uplink signal to each of the ONUs, so that the bandwidth allocated to each of the wavelengths of the uplink signal is larger than or equal to the sum of the target bandwidths for each of the ONUs to which each of the wavelengths of the uplink signal is allocated.

6. The wavelength and bandwidth allocation method according to claim 1,
wherein the wavelength allocation step is a first wavelength allocation step, and
wherein the method further comprises a further wavelength allocation step that includes:
calculating a subtraction bandwidth obtained by subtracting the target bandwidth from the actual bandwidth; and
exchanging, between the ONU with the smallest subtraction bandwidth and the ONU with the largest subtraction bandwidth, the wavelengths of the uplink signal allocated in the first wavelength allocation step.

7. The wavelength and bandwidth allocation method according to claim 6, wherein the target bandwidth calculation step and the further wavelength allocation step are performed for each of a plurality of times of bandwidth allocation periods, and the bandwidth allocation step is performed for each bandwidth allocation period.

8. The wavelength and bandwidth allocation method according to claim 6, wherein the target bandwidth calculation step, the further wavelength allocation step, and the bandwidth allocation step are performed for each bandwidth allocation period.

9. The wavelength and bandwidth allocation method according to claim 1,
wherein the wavelength allocation step is a first wavelength allocation step, and
wherein the method further comprises a further wavelength allocation step that includes:
calculating a subtraction bandwidth obtained by subtracting the target bandwidth from the actual bandwidth; and
changing (a) one of the wavelengths of the uplink signal allocated in the first wavelength allocation step to the ONU with the smallest subtraction bandwidth to (b) other of the wavelengths of the uplink signal allocated in the first wavelength allocation step to the ONU with the largest subtraction bandwidth.

10. The wavelength and bandwidth allocation method according to claim 9, wherein the target bandwidth calculation step and the further wavelength allocation step are performed for each of a plurality of times of bandwidth allocation periods, and the bandwidth allocation step is performed for each bandwidth allocation period.

11. The wavelength and bandwidth allocation method according to claim 9, wherein the target bandwidth calculation step, the further wavelength allocation step, and the bandwidth allocation step are performed for each bandwidth allocation period.

12. The wavelength and bandwidth allocation method according to claim 1,
wherein the wavelength allocation step is a first wavelength allocation step, and
wherein the method further comprises a further wavelength allocation step that includes allocating each of the wavelengths of the uplink signal to each of the ONUs, so that the bandwidth allocated to each of the wavelengths of the uplink signal is larger than or equal to the sum of the target bandwidths for each of the ONUs to which each of the wavelengths of the uplink signal is allocated.

13. The wavelength and bandwidth allocation method according to claim 12, wherein the target bandwidth calculation step and the further wavelength allocation step are performed for each of a plurality of times of bandwidth allocation periods, and the bandwidth allocation step is performed for each bandwidth allocation period.

14. The wavelength and bandwidth allocation method according to claim 12, wherein the target bandwidth calculation step, the further wavelength allocation step, and the bandwidth allocation step are performed for each bandwidth allocation period.

15. The wavelength and bandwidth allocation method according to claim 1, wherein in the target bandwidth calculation step, the target bandwidth for each of the ONUs is calculated based on the reference bandwidth distributed to each of the ONUs and history information of a requested bandwidth requested by each of the ONUs.

16. A non-transitory computer readable storage media containing executable computer program instructions which when executed cause a wavelength and bandwidth allocation program, which is carried out by one optical line terminal (OLT) in a passive optical communication network in which a plurality of optical network units (ONUs) are connected to the OLT, each of the ONUs transmits an uplink signal of any one of a plurality of previously provided wavelengths to the OLT, and the OLT receives the uplink signals of all the previously provided wavelengths from each of the ONUs, causes the OLT to perform a method comprising:
a target bandwidth calculation step of distributing all bandwidths of the previously provided wavelengths to each of the ONUs as a reference bandwidth based on a subscription service class to which each of the ONUs subscribes, and calculating a target bandwidth for each of the ONUs based on the reference bandwidth distributed to each of the ONUs;
a wavelength allocation step of allocating each of the wavelengths of the uplink signal to each of the ONUs so that a bandwidth allocated to each of the wavelengths of the uplink signal is larger than or equal to a sum of target bandwidths for each of the ONUs to which each of the wavelengths of the uplink signal is allocated; and
a bandwidth allocation step of, in each of the wavelengths of the uplink signal, allocating a bandwidth to each of the ONUs based on any one of a plurality of requested bandwidths accepted from each of the ONUs in each wavelength of the uplink signal so that the bandwidth actually allocated to each of the ONUs converges to the target bandwidth allocated as a target to each of the ONUs.

17. The non-transitory computer readable storage media according to claim 16, wherein in the target bandwidth calculation procedure, the target bandwidth for each of the ONUs is calculated based on the reference bandwidth distributed to each of the ONUs and history information of a requested bandwidth requested by each of the ONUs.

* * * * *